United States Patent [19]

Hirschfeld

[11] Patent Number: 4,528,078
[45] Date of Patent: Jul. 9, 1985

[54] NONSATURABLE MICRODRYER

[75] Inventor: Tomas B. Hirschfeld, Livermore, Calif.

[73] Assignee: The United States of America as represented by the United States Department of Energy, Washington, D.C.

[21] Appl. No.: 612,954

[22] Filed: May 23, 1984

[51] Int. Cl.³ .............................................. C25B 1/04
[52] U.S. Cl. .................... 204/129; 204/1 R; 204/277; 204/278; 204/283
[58] Field of Search .............. 204/129, 277, 278, 283, 204/1 R, 271; 423/580, 645

[56] References Cited

U.S. PATENT DOCUMENTS

| | | | |
|---|---|---|---|
| 3,086,924 | 4/1963 | Bentley et al. | 204/1 |
| 3,188,283 | 6/1965 | Cole | 204/129 |
| 3,400,069 | 9/1968 | Dreckmann | 204/278 |
| 3,474,023 | 10/1969 | Bloch | 204/265 |
| 3,475,302 | 10/1969 | Langer et al. | 204/129 |
| 4,050,995 | 9/1977 | Bredeweg | 204/1 T |
| 4,094,652 | 6/1978 | Lowther | 55/33 |
| 4,247,988 | 2/1981 | Berkowitz et al. | 34/1 |
| 4,332,663 | 6/1982 | Berneke | 204/277 |

OTHER PUBLICATIONS

"Microdryer for Permanent Protection of Enclosures", by Hirschfeld et al, UCRL 89116 Abstract, 4-28-83.

Primary Examiner—R. L. Andrews
Attorney, Agent, or Firm—Stephen C. Macevicz; L. E. Carnahan; Judson R. Hightower

[57] ABSTRACT

A nonsaturable microdryer is provided for electrolytically removing moisture from sealed containers, particularly electronic equipment. An electrode/electrolyte assembly is disposed within a channel between the interior and exterior of a sealed container. A catalytic barrier disposed between the interior of the sealed container and the electrode/electrolyte assembly prevents the build-up of explosive concentrations of hydrogen by converting back-diffusing hydrogen and oxygen back into water, which is then recycled. A semipermeable membrane disposed between the exterior of the sealed container and the electrode/electrolyte assembly allows selective removal of hydrogen and prevents intake of water.

13 Claims, 2 Drawing Figures

NONSATURABLE MICRODRYER

BACKGROUND OF THE INVENTION

The U.S. Government has rights in this invention pursuant to Contract No. W-7405-ENG-48 between the U.S. Department of Energy and the University of California, for the operation of Lawrence Livermore National Laboratory.

The invention relates generally to methods and apparatus for dehumidifying gases and, more particularly, to electrolytic dehumidification of gases in sealed enclosures.

Currently the interiors of small and medium sized sealed enclosures, such as cameras, electronic instrument packages, munitions, and the like, are dehumidified with desiccant dryers, such as water-sorbent silicon gels, Drierite (tradename for anhydrous calcium sulfate manufactured by Drierite Co., Xenia, OH), or the like. Alternatively, in situations where portability is not required, standard high-volume air conditioning methods are used, wherein air is cooled so that moisture condenses out and is collected in liquid form. Where portability is required, and where the enclosures are small, silicon-based desiccants are almost exclusively used. The major drawbacks of such desiccants are that they eventually saturate, requiring replacement, and that they are relatively bulky, which is a problem in some munitions applications.

Electrolytic drying of gases has been known and used for many years. For example, Cole in U.S. Pat. No. 3,188,283 discloses the use of a moisture absorbing solid electrolyte to remove water from a gas stream. He also suggests the use of a semipermeable membrane, such as a heated palladium diaphragm, to remove potentially dangerous electrolytic decomposition products, such as hydrogen gas. However, Cole depends on a product concentration gradient to drive the dangerous product from the container or conduit which contains the moisture laden gas. Such means for removal is slow as hydrogen concentration differences across a semipermeable membrane must be kept extremely small. Hydrogen concentrations greater than 1 percent are potentially explosive. The rate of removal could be increased by increasing the size of the semipermeable membrane, but then miniaturization becomes impossible, and the need for the larger diffusion port may constitute an unacceptable design constraint.

The foregoing illustrates the state of the current technology. It would be advantageous to provide an alternative to available methods; particularly in regard to dehumidifying small-sized sealed enclosures containing water-sensitive components.

SUMMARY OF THE INVENTION

It is therefore an object of the invention to provide an apparatus and method for dehumidifying sealed enclosures containing water-sensitive components.

Another object of the invention is to provide an improved means for selectively removing hydrogen gas from sealed containers.

Still another object of the present invention is to provide an electrolytically-based dehumidification apparatus which is completely portable, amenable to miniaturization, and compatible for use witn commercially available electronic components.

Another object of the invention is to provide a highly energy-efficient means for electrolytically dehumidifying sealed-containers.

A further object of the invention is to provide an apparatus which quantitatively senses humidity.

These and other objects are attained in accordance with the present invention where, in a channel between the interior and exterior of a sealed container, a hygroscopic solid electrolyte material is inserted between a first and a second gas-permeable electrodes (hereafter referred to as porous electrodes) to form an electrode/electrolyte assembly; a catalytic layer is disposed between the electrode/electrolyte assembly and the interior of the sealed container so that it spans the channel; and a semipermeable membrane, which is impermeable to water but permeable to hydrogen, is disposed between the electrode/electrolyte assembly and the exterior of the sealed container sucn that it spans the channel. An alternating voltage is applied across the first and second electrodes for electrolytically breaking down water into hydrogen and oxygen.

The present invention is directed to the problem of providing miniature, nonsaturable denumidifiers for sealed containers. It advantageously overcomes many problems encountered in the art by combining (1) a means for decomposing water electrolytically, which is made highly efficient and suitable for miniaturization by the use of thin film solid polymer electrolytes and the application of an alternating voltage of predetermined frequency and magnitude, (2) a semipermeable membrane for permitting the outflow of hydrogen and oxygen gases while at the same time preventing the inflow of water vapor, (3) a porous metal electrode to reduce electrical resistance thereby increasing water removing capacity, (4) a method of forming low resistance contacts between the porous metal electrodes and the electrolyte, and (5) a catalytic layer to react back-diffusing hydrogen with oxygen to prevent the build up of appreciable amounts of hydrogen gas in the interior of a sealed container. The water produced at the catalytic layer recycles through the electrolytic layer for further removal.

One embodiment of the invention is capable of converting water into hydrogen and oxygen with about 60 percent electrical efficiency. Thus, the embodiment can remove of about 1.8 grams per year of water per milliamp of current. Furthermore, the amount of current drawn by the microdryer is directly related to the amount of water present, thereby providing a means for measuring humidity.

DETAILED DESCRIPTION OF THE INVENTION

Reference will now be made in detail to the present preferred embodiments of the invention, examples of which are illustrated in the accompanying drawings.

In accordance with the present invention an apparatus is provided for dehumidifying sealed containers wherein a channel is provided between the interior and exterior of a sealed container, a hygroscopic solid electrolyte is disposed between a first and a second porous electrode to form an electrode/electrolyte assembly which, in turn, is disposeo inside the channel; a catalytic layer spanning the channel is disposed between the electrode/electrolyte assembly and the interior of the sealed container; a semipermeable membrane spanning the channel is disposed between the electrode/electrolyte assembly and the exterior of the sealed container; and an alternating voltage of a predetermined waveform, frequency, and magnitude is applied across the electrolyte by way of the first and second porous electrodes.

The alternating voltage causes the electrolytic breakdown of water in the hygroscopic solid electrolyte into hydrogen and oxygen. The gases then diffuse away from the electrode/electrolyte assembly. The semipermeable membrane allows the hydrogen gas to pass to the exterior of the sealed container, but prevents water vapor from the exterior from entering the sealed container. Hydrogen gas which diffuses towards the interior of the sealed container is catalytically re-converted into water by the catalytic layer to prevent the build up of a dangerous concentration of the gas. The reconstituted water is then recycled: a portion diffuses back into the interior of the sealed container, and a portion diffuses back to the electrode/electrolyte assembly where it is again broken down into hydrogen and oxygen.

An alternating voltage minimizes the electrical resistance across the solid electrolyte which arises from polarization of the ionic species within the electrolyte. The frequency of the alternating voltage depends critically on the diffusibility of the electrolysis products in the solid electrolyte and on the dielectric constant of the solid electrolyte. For most efficient operation, the preferred voltage varies between positive and negative values of a predetermined magnitude. Thus, both porous electrodes must be electrically insulated from other conductive components of the sealed container. An example of such an embodiment is illustrated if FIG. 1. For simplicity of manufacture and installation, the preferred voltage varies between ground and a predetermined negative magnitude. In such an alternative embodiment only one porous electrode need be electrically insulated from other conductive components of the sealed container. The other, non-insulated porous electrode is simply grounded. An example of the alternative embodiment is illustrated in FIG. 2.

Figure 1:
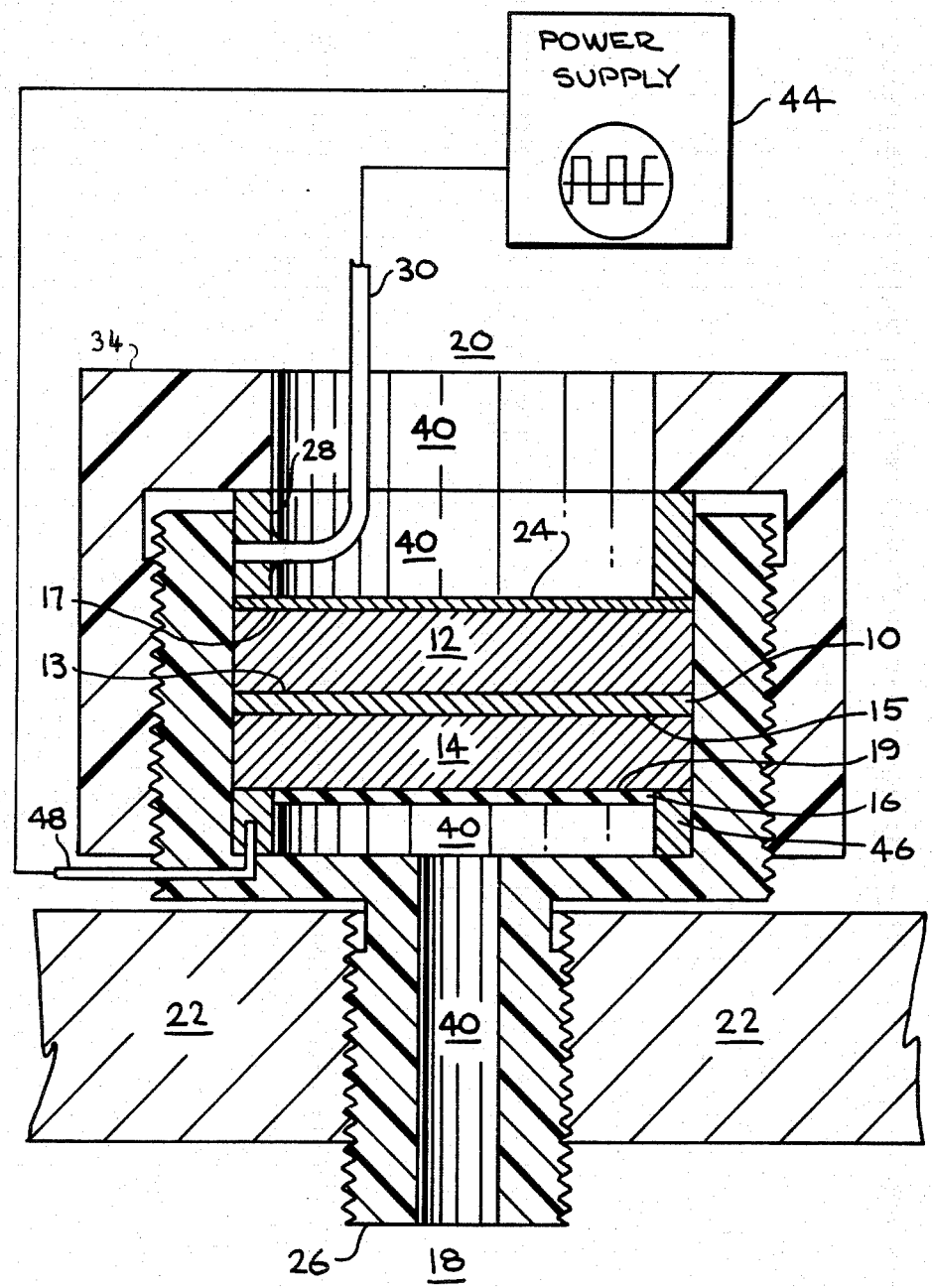
FIG. 1 is a cross section of one embodiment of the invention.
Figure 2:
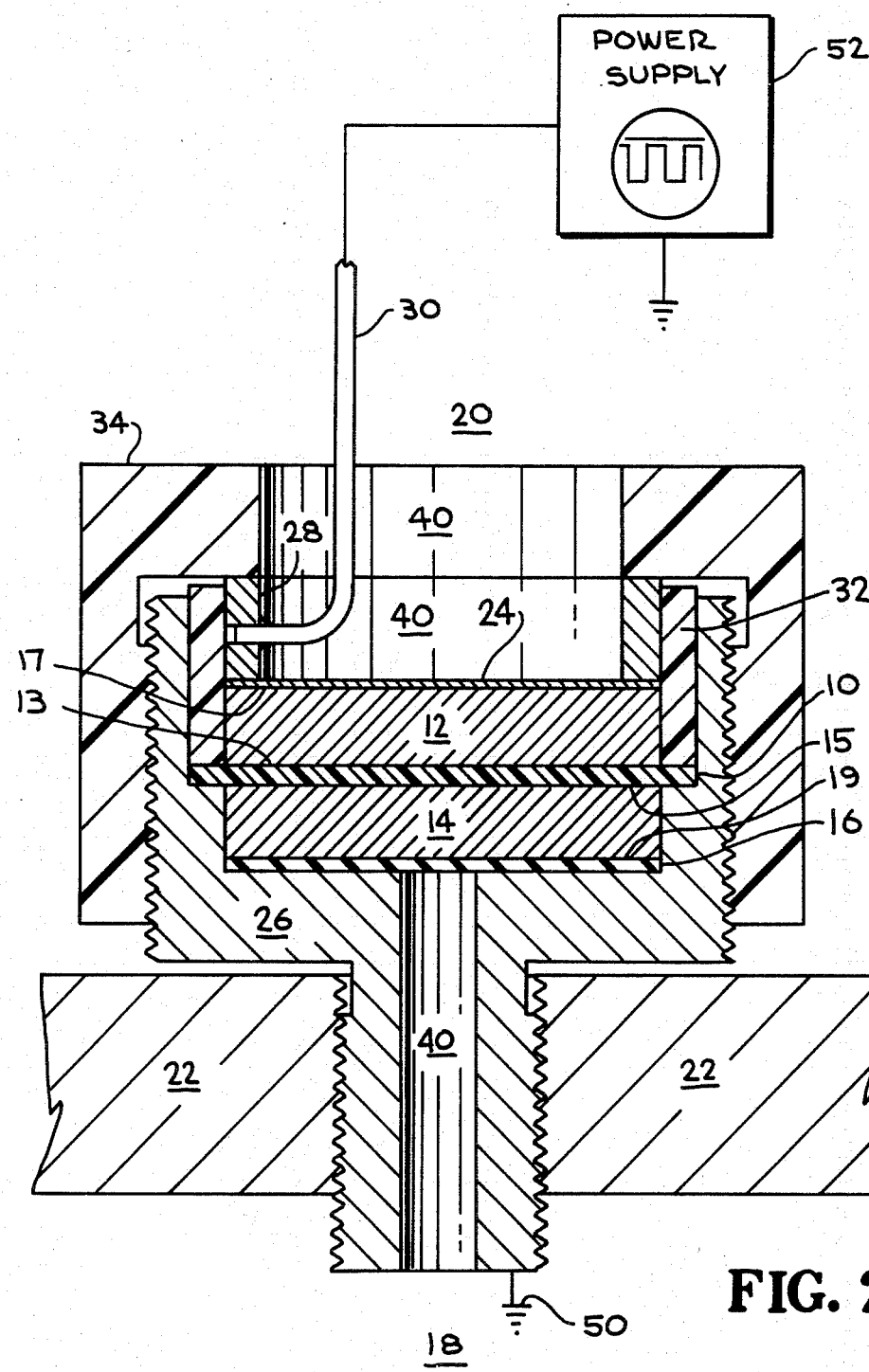
FIG. 2 is a cross section of an alternative embodiment of the invention.

Referring now to FIG. 1, a solid electrolyte 10 preferably comprises an organic polymer; more preferably, solid electrolyte 10 comprises a perfluoropolymer; and most preferably solid electrolyte 10 comprises a polymer of perfluorinated sulphonic acids, such as Nafion (a trademarked product available from DuPont, E. I., Demours & Co., Wilmington, DE) having a thickness of about 170–180 $\mu$m. Preferably solid electrolyte 10 comprises a hygroscopic material, such as Nafion.

Solid electrolyte 10 is disposed between a first porous electrode 12, having a first surface 17 and a second surface 13, and a second porous electrode 14, having a first surface 15 and a second surface 19, to form an electrode/electrolyte assembly, comprising components 10, 12, and 14. (The porosity of electrodes 12 and 14 is in reference to gases and water vapor, as discussed more fully below.) Solid electrolyte 10 is in electrical contact with the first surface 15 of the second porous electrode 14 and the second surface 13 of the first porous electrode 12. The area of this electrical contact determines in part the drying capacity of the microdryer. A larger area permits a greater amount of current to be driven through the electrolyte at a given voltage. As the current is proportional to the amount of electroylsis taking place, the area is related to dehumidifying capacity. Efficient electrical contacts are made between the porous electrodes and the solid electrolyte by putting an elevated voltage across the electrolyte for a predetermined duration after assembly. Such voltage, just below the break down voltage of the electrolyte, causes the electrolyte to bond fixedly to the porous electrodes. For example, for a Nafion disk 175 $\mu$m thick, 5–10 volts are applied for about 10–20 minutes (15 minutes preferred) to make a suitable contact. As the contact forming voltage depends on the materials and geometry of a particular embodiment, the precise voltage and duration of application are best determineo empirically.

Preferably, the porous electrodes 12 and 14 are made of metal resistant to the corrosive action of air, water, and sea water, such as stainless steel, gold, titanium, nickel, nickel alloys, or the like. Electrode porosity is attained by using the above materials in the form of wire meshes, gratings, perforated or sintered sheets or plates, or the lixe. Sintered sheets or plates are the preferred form of the porous electrodes. More preferably the electrodes are made of a sintered nickel alloy containing in excess of 50 percent nickel; and most preferably, the electrodes are maoe of a sintered Monel metal, such as Monel alloy 400 (a trademarked alloy sold by Huntington Alloys, Huntington, WV).

The electrode/electrolyte assembly is disposed inside a means defining a channel, generally indicated by 40. By way of example, means defining a channel or channel means, is defined by the inner surfaces of components 26, 28, 34, and 46 in FIG. 1, and 26, 28, 32, and 34 in FIG. 2 (the individual components being described more fully below). In both figures the microdryer is mounted substantially in an interior 20 of a sealed container 22 (only a portion of the container being shown). This mounting configuration is not critical to the invention.

A semipermeable membrane 16 is disposed between the electrode/electrolyte assembly and exterior 18 of the sealed container 22 (only a portion of the container being shown). Semipermeable membrane 16 spans the channel, generally indicated by 40, so that no gas can enter or exit the sealed container without passing through the semipermeable membrane 16. The semipermeable membrane is selectively permeable to hydrogen gas, and selectively impermeable to water vapor. Thus, it permits hydrogen, a potentially explosive electrolysis product, to be exhausted from the sealed container; at the same time the semipermeable membrane inhibits the entry of water vapor into the sealed container. Many suitable materials can be employed for the semipermeable membrane 16. Perry, in U.S. Pat. No. 4,172,885 gives an extensive list of membrane materials useful for recovering hydrogen gas from purge gases in an ammonia synthesis process. Tne membrane materials listed in Perry and the principles of their use are applicable to the present invention. Accordingly, the membrane materials listed in U.S. Pat. No. 4,172,885 are incorporated by reference.

The thickness of sempermeable membrane 16 depends on its composition and on the particular conditions under which the microdryer is used. Generally semipermeable membranes are not perfectly selective in passing hydrogen gas and inhibiting the passage of water vapor. Moreover, the rate of flow of a gas tnrough a semipermeable membrane depends critically on its thickness. Consequently, the most suitable thickness of semipermeable 16 is arrived at empirically by taking into consideration (1) the kind of material out of which the semipermeable membrane is made, (2) the amount of water vapor needed to be removed from an interior 20 of the sealed container, and (3) the amount of water vapor likely to be present in the environment in which the sealed container is placed. Thus, under certain conditions, e.g., high external humidity, the choice of membrane thickness involves a trade off between the capacity to exhaust hydrogen gas and the capacity to prevent leakage of water vapor into the sealed container from the environment.

Preferably semipermeable membrane 16 is made of silicone rubber; more preferably the semipermeable membrane is made of a silicone rubber made from a fluorosilicone polymer, such as poly (METHYL-3,3,3-TRIFLUOROPROPYL)-1-2 percent (METHYLVINYLSILOXANE) copolymer (e.g., available from Petrarch Systems, Inc., Bristol, PA).

A catalytic layer 24 is disposed between the electrode/electrolyte assembly and interior 20 of the sealed container 22. Catalytic layer 24 spans channel 40 so that no gas can enter or exit the sealed container through the channel without passing through catalytic layer 24. The catalyst comprising layer 24 recombines oxygen and hydrogen that back diffuses toward the interior 20 of the sealed container 22. The catalytic conversion of hydrogen and oxygen back into water prevents the build up of dangerous quantities of hydrogen gas in the interior 20 of the sealed container 22.

The catalytic layer 24 can comprise any of the platinum group metals. Preferably, catalytic layer 24 comprises platinum black or palladium black (e.g., Palladium PEI powder available from Pierce Chemical Company, Rockford, IL).

As mentioned above, the means defining a channel, generally indicated by 40, is defined by components 26, 28, 34, and 46 in FIG. 1. Particular means for forming a channel are not critical to the invention. In the embodiment illustrated in FIG. 1, member 26 holds the electrode/electrolyte assembly, provides a means for attaching the microdryer to the sealed container, and forms a portion of the channel means, generally indicated by 40. In this embodiment, member 26 is made from insulating material, such as nylon, teflon, or the like. Member 46 provides an electrical connection between second porous electrode 14 and lead 48 which, in turn, is connected to a power supply 44. Member 46 also forms a portion of the channel means. Member 28 provides an electrical connection between first porous electrode 12 and a lead 30 which, in turn, is connected to power supply 44. Member 28 also forms a portion of the channel, generally indicated by 40. Member 34 is attached by threaded connection to member 26 and holds in place components 10, 12, 14, 28, and 46 which are inserted in member 26. Member 34 is made from insulating material, such as nylon, teflon, or the lixe.

Power supply 44 provides an alternating voltage which varies between positive and negative values of a predetermined voltage. The predetermined voltage must be high enough for electrolysis to take place, but not so high as to cause a break down of the solid electrolyte. The predetermined voltage is readily determined empirically: it depends on the type of solid electrolyte used, its thickness, and its area in contact with the porous electrodes. Preferably the wave form of the alternating voltage is square. The square wave eliminates times during which the voltage across the electrode is below that which is necessary for electrolysis. Thus, the preferred wave form allows more efficient dehumidification.

As mentioned above, FIG. 2 is an illustration of an alternative embodiment wherein one porous electrode is electrically insulated and the other is grounded. The electrically insulated porous electrode is referred to as an insulated porous electrode in this embodiment. Except as indicated below like numbered components in FIGS. 1 and 2 perform the same functions and are composed of the same material. In FIG. 2 member 26 is made of a conductive material and is in electrical contact with porous electrode 14. Member 26 is grounded directly, as shown by ground 50; or it is grounded indirectly by virtue of its contact with a grounded component of the sealed container 22. Member 32 prevents insulated porous electrode 12 from coming into electrical contact with member 26. Member 32 is made of an insulative material such as nylon, teflon, or the like.

Power supply 52 provides an alternating voltage which varies between ground and a predetermined negative value. As mentioned above, tnis embodiment is less efficient because electrolysis takes place only during fifty percent of the voltage cycle.

EXAMPLE

An example of the embodiment illustrated in FIG. 2 was reduced to practice using materials of the following types and dimensions: porous electrodes 12 and 14: 0.37 in. diameter, 0.07 in. thick, made of sintered monel with 40 $\mu$m frit; and solid electrolyte 10: Nafion disk 0.37 in. diameter, 175 $\mu$m thick. The microdryer was connected to a glass desiccator jar of a approximately one cubic foot in volume by a short length of surgical tubing. Instead of being grounded, member 26 was electrically connected to a power supply similar to power supply 44 in FIG. 1. This was possible because the microdryer, in particular member 26, was electrically isolated from the desiccator jar. Under these conditions an alternating voltage can be applied that varies between positive and negative values of a predetermined voltage so that the microdryer can be operated at maximum efficiency. No semipermeable membrane was employed as the gases exhausted by the microdryer were released into a stream of dry nitrogen gas. The invention is not limited by the materials and dimensions of this particular example. This example is presented to demonstrate the operability of the invention. For this example a 10 kHz square wave varying between +2.0 and −2.0 volts was applied across electrolyte 10 (although the particular embodiment of this example is operable for voltages between 1.3 and 2.5 volts and frequencies between 8–12 kHz). Under initial conditions of 100 percent humidity within the desiccator jar, the particular embodiment drew 40–50 milliamps. After 24 hours the particular embodiment was drawing 1 milliamp, and the humidity within the desiccator jar was reduced to approximately 2 percent.

The descriptions of the foregoing embodiments and examples of the invention have been presented for purposes of illustration and description. They are not intended to be exhaustive or to limit the invention to the precise form disclosed, and obviously many modifications and variations are possible in light of the above teaching. Tne examples were chosen and described in order to best explain the principles of the invention and its practical application to thereby enable others skilled in the art to best utilize the invention in various contexts and with various modifications as are suited to the particular use contemplated. It is intended that the scope of the invention be defined by the claims appended hereto.

I claim:

1. An apparatus for electrolytically removing moisture from a volume of gas enclosed by an associated sealed container, the apparatus comprising:
   (a) a first porous electrode;
   (b) a second porous electrode;
   (c) a hygroscopic solid electrolyte disposed between and forming electrical contacts witn the first porous electrode and the the second porous electrode to form an electrode/electrolyte assembly;
   (d) means defining a channel between the interior of the associated sealed container and the exterior of the associated sealed container, the electrode/electrolyte assembly being disposed in the channel;
   (e) a catalytic layer for enhancing the formation of water from hydrogen and oxygen, the catalytic layer being disposed inside the channel between the electrode/electrolyte assembly and the interior of the associated sealed container, and the catalytic layer spanning the channel such that any gas passing through the channel must pass through the catalytic layer;
   (f) a semipermeable membrane for selectively inhibiting the passage of water vapor and for selectively permitting the passage of hydrogen gas, the semipermeable membrane being disposed inside the channel between the electrode/electrolyte assembly and the exterior of the associated sealed container, and the semipermeable membrane spanning the channel such that any gas passing through the channel must pass through the semipermeable membrane; and
   (g) means for providing an alternating voltage across the hygroscopic solid electrolyte by way of the first and second porous electrodes for electrolyzing water, the alternating voltage having a predetermined magnitude, frequency, and waveform.

2. The apparatus as recited in claim 1, wherein said hygroscopic solid electrolyte is an organic polymer.

3. The apparatus as recited in claim 2, wherein said organic polymer is a polymer of perfluorinated sulphonic acid.

4. The apparatus as recited in claim 3, wherein said polymer of perfluorinated sulphonic acid is Nafion.

5. The apparatus as recited in claim 1, wherein said first and second porous electrodes are made of a porous nickel alloy.

6. The apparatus as recited in claim 5, wherein said porous nickel alloy is sintered Monel.

7. The apparatus as recited in claim 1, wherein said first and second electrodes are electrically insulated from said associated sealed container and wherein said predetermined waveform of said alternating voltage is square such that said alternating voltage varies between the positive and negative values of said predetermined magnitude.

8. The apparatus as recited in claim 7, wherein said predetermined magnitude is at least about 1.3 volts.

9. The apparatus as recited in claim 8, wherein said hygroscopic solid electrolyte is a Nafion sheet between about 170 and 180 $\mu$m thick, wherein said predetermined magnitude is between about 1.3 volts and 2.5 volts, and wherein said predetermined frequency is between about 8 kHz and 12 kHz.

10. The apparatus as recited in claim 1, wherein at least one of said first or second porous electrodes is electrically insultated from said associated sealed container to form an insulated porous electrode, and wherein said predetermined waveform of said alternating voltage is square such that said alternating voltage varies between ground and a predetermined negative value, said alternating voltage periodically reducing the electrical potential of the insulated porous electrode to the predetermined negative value.

11. The apparatus recited in claim 9, wherein said predetermined negative value is at most about −1.3 volts.

12. A method of dehumidifying a sealed container comprising the steps of:
   (a) providing a channel between the exterior and interior of the sealed container;
   (b) electrolytically transforming water into hydrogen and oxygen by an electrode/electrolyte assembly disposed inside the channel, the electrode/electrolyte assembly having a hygroscopic electrolyte;
   (c) selectively removing a portion of the hydrogen gas generated by the electrode/electrolyte assembly from the interior of the sealed container and selectively inhibiting the influx of water from the exterior of the sealed container to the interior of the sealed container by a semipermeable membrane, the semipermeable membrane being disposed in the channel between the electrode/electrolyte assembly and the exterior of the sealed container; and
   (d) catalytically transforming hydrogen generated by the electrode/electrolyte assembly and diffusing toward the interior of the sealed container back into water by a catalytic layer disposed inside the channel betwenn the electrode/electrolyte assembly and the interior of the sealed container, a portion of said water formed by the catalytic layer being re-absorbed by the hygroscopic electrolyte of the electrode/electrolyte assembly where said water is electrolytically transformed into hydrogen and oxygen.

13. The method as recited in claim 10, wherein the step of electrolytically transforming further includes the steps of:
   (a) providing an electrode/electrolyte assembly with a first porous electrode, a second porous electrode, and a solid hygroscopic electrolyte sandwiched between and making electrical contact with the first porous electrode and the second porous electrode; and
   (b) applying alternating voltage across the solid electrolyte by way of the first and second porous electrodes for electrolyzing water, the alternating voltage having a predetermined magnitude, frequency, and waveform.

* * * * *